(12) United States Patent
Chang et al.

(10) Patent No.: US 8,336,002 B2
(45) Date of Patent: Dec. 18, 2012

(54) IC DESIGN FLOW ENHANCEMENT WITH CMP SIMULATION

(75) Inventors: Gwan Sin Chang, Hsinchu (TW); Yi-Kan Cheng, Taipei (TW); Ivy Chiu, Hsinchu (TW); Ke-Ying Su, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 467 days.

(21) Appl. No.: 11/688,654

(22) Filed: Mar. 20, 2007

(65) Prior Publication Data
US 2007/0266356 A1 Nov. 15, 2007

Related U.S. Application Data

(60) Provisional application No. 60/800,526, filed on May 15, 2006.

(51) Int. Cl.
*G06F 17/50* (2006.01)
(52) U.S. Cl. ............... 716/52; 716/51; 716/53; 716/54; 716/55; 716/56; 430/5; 430/30
(58) Field of Classification Search .............. 716/5–6, 716/19–21, 50–56; 430/5, 30
See application file for complete search history.

(56) References Cited

U.S. PATENT DOCUMENTS

| | | | |
|---|---|---|---|
| 5,847,965 A | 12/1998 | Cheng | |
| 6,077,310 A | 6/2000 | Yamamoto et al. | |
| 6,408,219 B2 | 6/2002 | Lamey, Jr. et al. | |
| 6,611,948 B1 * | 8/2003 | Tyler et al. | 716/6 |
| 7,024,640 B2 | 4/2006 | Buchanan | |
| 7,284,214 B2 | 10/2007 | LeBritton et al. | |
| 7,363,207 B2 * | 4/2008 | Kamon | 703/13 |
| 7,406,671 B2 | 7/2008 | Corbeil et al. | |
| 7,467,365 B2 | 12/2008 | Chang et al. | |
| 2005/0044514 A1 | 2/2005 | Wu et al. | |
| 2005/0132306 A1 * | 6/2005 | Smith et al. | 716/1 |
| 2006/0026539 A1 | 2/2006 | Tetelbaum et al. | |
| 2006/0123380 A1 * | 6/2006 | Ikeuchi | 716/21 |
| 2007/0055892 A1 | 3/2007 | Pikus | |
| 2007/0201442 A1 | 8/2007 | Hekmatpour et al. | |
| 2007/0234246 A1 | 10/2007 | Sinha et al. | |
| 2007/0266356 A1 | 11/2007 | Chang et al. | |
| 2007/0266362 A1 | 11/2007 | Lai et al. | |
| 2007/0288219 A1 | 12/2007 | Zafar et al. | |
| 2008/0010623 A1 | 1/2008 | Koizumi | |

OTHER PUBLICATIONS

"An Analytical Model of Multiple ILD Thickness Variation Induced by Interaction of Layout Pattern and CMP Process", by Charles Ouyang, Kyungsuk Ryu, Linda Milor, Wojciech Maly, Gene Hill, Yeng-kaung Peng , IEEE Transactions On Semiconductor Manufacturing, Aug. 2000.*

(Continued)

*Primary Examiner* — Nha Nguyen
(74) *Attorney, Agent, or Firm* — Haynes and Boone, LLP (57) ABSTRACT

An integrated circuit (IC) design method includes providing IC design layout data; simulating a chemical mechanical polishing (CMP) process to a material layer based on the IC design layout, to generate various geometrical parameters; extracting resistance and capacitance based on the various geometrical parameters from the simulating of the CMP process; and performing circuit timing analysis based on the extracted resistance and capacitance.

20 Claims, 4 Drawing Sheets

OTHER PUBLICATIONS

Raghvendra, Srinivas et al., "DFM: Linking Design and Manufacturing," Proceedings of the 18$^{th}$ International Conference on VLSI Design Held Jointly with 4$^{th}$ International Conference on Embedded Systems Design, VLSID, 2005, pp. 705-708.

Tsujikawa, Hiroyuki et al., "Power-Supply Noise Reduction with Design for Manufacturability," IEICE Trans Fundamentals, vol. E88-A, No. 12, Dec. 2005, pp. 3421-3428.

Chappell, Jeff, "The Future is the FOUP—Company Business and Marketing," Electronic News, Jul. 17, 2000, 2 pages.

Chen, Kuan-Chou, et al., "Integrated Circuits Industry / Front-Opening Unified Pod Audo-Loading Structure," Knowledge Bridge, No. 22, Apr. 2002, 4 pages.

Ottesen, Craig, "Front Opening Pod (FOUP) Fire Protection: A General Overview", Inteternational Sematech, Nov. 5, 1999, 10 pages.

Charles Ouyang, Kyungsuk Ryu, Linda Milor, Wojciech Maly, Gene Hill and Yeng-Kaung Peng, "An Analytical Model of Multiple ILD Thickness Variation Induced by Interaction of Layout Pattern and CMP Process," IEEE Transactions on Semiconductor Manufacturing, Aug. 2000, pp. 286-292, vol. 13, No. 3.

U.S. Patent Office, Office Action dated Jul. 23, 2009, U.S. Appl. No. 11/949,311, 24 pages.

U.S. Patent Office, Office Action dated Jul. 23, 2009, U.S. Appl. No. 11/960,900, 24 pages.

Office Action issued by the United States Patent and Trademark Office in related U.S. Appl. No. 11/960,900, 24 pages.

Office Action issued by the United States Patent and Trademark Office in related U.S. Appl. No. 11/949,311, 24 pages.

* cited by examiner

IC DESIGN FLOW ENHANCEMENT WITH CMP SIMULATION

CROSS-REFERENCE

This application claims the benefit of U.S. Provisional Application 60/800,526 entitled "Design for Manufacturability," filed May 15, 2006, herein incorporated by reference in its entirety. The present disclosure is related to the following commonly-assigned U.S. patent applications, the entire disclosures of which are hereby incorporated herein by reference: U.S. patent application by inventors Yi-Kan Cheng, Ke-Ying Su, and Victor C. Y. Chang for "METAL THICKNESS SIMULATION (VCMP) FOR IMPROVING RC EXTRACTION ACCURACY" Ser. No. 11/688,692.

BACKGROUND

Semiconductor technologies are continually progressing to smaller feature sizes, such as 65 nanometers, 45 nanometers, and below. Integrated circuits (IC) fabrication technologies have been exploited to a limit and need more interactions between manufacturing and designing.

One such limit relates to metal thickness. Current IC design flow only considers ideal or simplified models for metal thickness substitution. The current method for signal analysis and design performance evaluation cannot reflect the variations in metal thickness that actually occur during fabrication. For example, in the current design flow, the IC design layouts have no proper way to connect to and incorporate with a chemical mechanical polishing (CMP) process. However, the variations of the metal thickness from the CMP process seriously impacts the signal wire characteristics, IC design functionality, and performance. For various environments, the same metal wire may have different thicknesses due to the CMP process, which results in variations of electrical properties of the signal wire.

BRIEF DESCRIPTION OF THE DRAWINGS

Aspects of the present disclosure are best understood from the following detailed description when read in association with the accompanying figures. It is noted that, in accordance with the standard practice in the industry, various features in the drawings are not drawn to scale. In fact, the dimensions of illustrated features may be arbitrarily increased or decreased for clarity of discussion.

DETAILED DESCRIPTION

It is understood that the following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Design for manufacturability, or DFM, is an integration of manufacturing data and design procedure for better yield and design efficiency. An interaction and communication between designer and manufacturer is enhanced thereby for more accurate, faster, and more efficient design. In one example, various manufacturing data are formulated, quantified, and integrated to enable collaboration between manufacturer and designer, reduce design time and design cost, and increase manufacturing yield and production performance. DFM can be realized at various design stages with collaboration of design tool vendors. The manufacturer may be a semiconductor foundry. The designer may be an integrated circuit (IC) design house. The design tool vendor may be an electronic design automation (EDA) tool vendor. In some examples, a single company may include all three.

Figure 1:
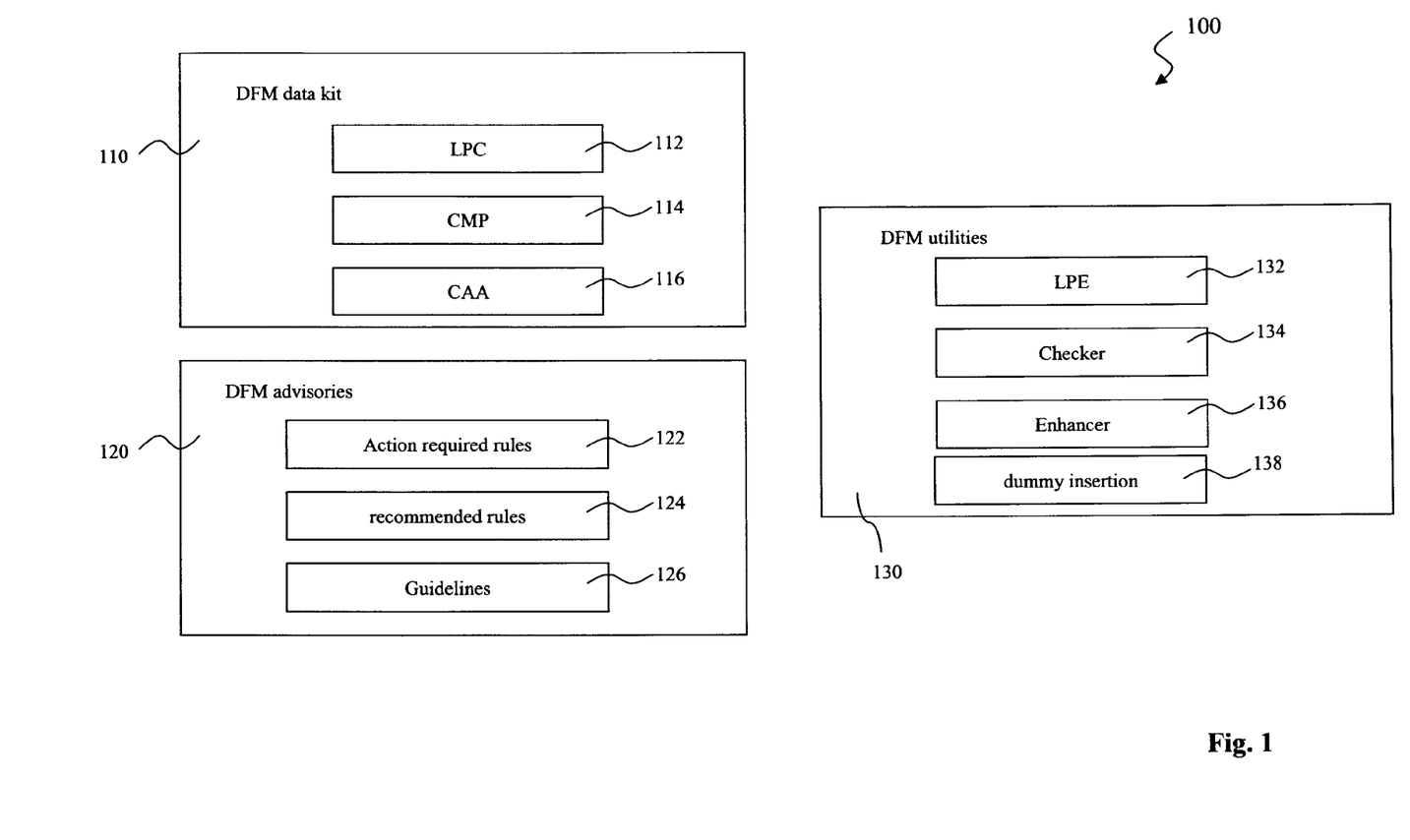
FIG. 1 is a block diagram illustrating one embodiment of a design for manufacturing (DFM) system constructed according to aspects of the present disclosure.

Referring to FIG. 1, an embodiment of a DFM tool kit 100 in a block diagram may include one or more various modules. In the present embodiment, the DFM tool kit 100 includes a DFM data kit (DDK) 110. Manufacturing data, such as processing recipes, tool characterization, manufacturing environment, production and processing statistical information, and IC testing and measurement data, are compiled, accumulated, and formulated to form the DDK and provide a manufacturing simulation such as lithography process check (LPC) simulation 112, chemical mechanical polishing (CMP) simulation 114, and/or critical area analysis (CAA) simulation 116. In LPC simulation 112, a lithography process can be simulated for a design layout by implementing DDK. Various failure areas, defect areas, or weak areas associated with the manufacturing process, referred to as hotspots, can be identified for further design tuning.

In the CMP simulation 114, a CMP process is simulated to a design layout by utilizing DDK 110. The design layout is converted to a material thickness and thickness hotspots can be identified for further design tweaking and tuning. CAA simulation 116 utilizes DDK for critical area identification and design improvement. DFM data may be packed in a unified format, referred to as DFM unified format (DUF). DDK 110 can be provided to an IC design vendor and be integrated into a design tool, or directly distributed to a designer such as a fab-less design house and employed by the designer in a design tool.

DFM tool kit 100 also includes DFM advisories 120. The DFM advisories 120 are extracted from the manufacturing information and provided for an IC design tool and/or a designer. The DFM advisories 120 further include DFM rules that can be incorporated into a design tool for checking any violation. DFM rules such as action required rules 122 are binding, requiring further actions to eliminate the associated violation. Recommended rules 124 are not binding and suggested for design improvement. The DFM advisories also include guidelines 146, provided for the designer to follow in implementing an IC design procedure.

DFM tool kit 100 also includes DFM utilities 130, utilizing DDK 110 and DFM advisories 120 in IC design. DFM utilities 130 may be integrated into a design tool and incorporated into a design flow. For example, dummy insertion may be implemented at the place-and-route design stage so that dummy features are automatically generated in the IC layout to reduce CMP manufacturing variances. DFM utilities 130 may provide corrective actions and solutions to the designer to guide for design improvement and tuning. For example, DFM utilities 130 may provide a solution to eliminate identified hotspots from a lithography process simulation, such as reconfiguring metal lines to eliminate the hotspots. In one embodiment, DFM utilities 130 include a layout parasitic extraction (LPE) deck 132 for extracting more accurate parasitic parameters such as parasitic resistance and capacitance with the manufacturing data such as CMP data, and further for providing suggested actions to adjust parasitic parameters and timing. DFM utilities 130 may also include a checker 134 that is integrated with DFM rules, is able to automatically check the layout for any DFM rule violation, and/or provides suggestions to eliminate the violation. DFM utilities 130 may include an enhancer 136 that is capable of automatically adjusting the layout to meet the DFM rules or eliminate identified hotspots. DFM utilities 130 may further include a dummy insertion module 138 to incorporate dummies (e.g., non-conducting metal features) into a design layout to eliminate CMP process variation.

DFM tool kit 100 provides model-based utilities from various simulations and rule-based utilities from DFM advisories. DFM tool kit 100 can be implemented at various designing stages and certain manufacturing stages. For example, dummy insertion may be implemented at place-and-route step such that the dummy features are included in a layout at early design stage. LPE deck may be implemented at extraction and a timing simulation. LPC may be implemented before the tape-out. Alternatively, LPC may be implemented after the tape-out. In this situation, the layout can be adjusted to eliminate hotspots identified by LPC before fabricating a mask of the layout in a mask shop.

Figure 2:
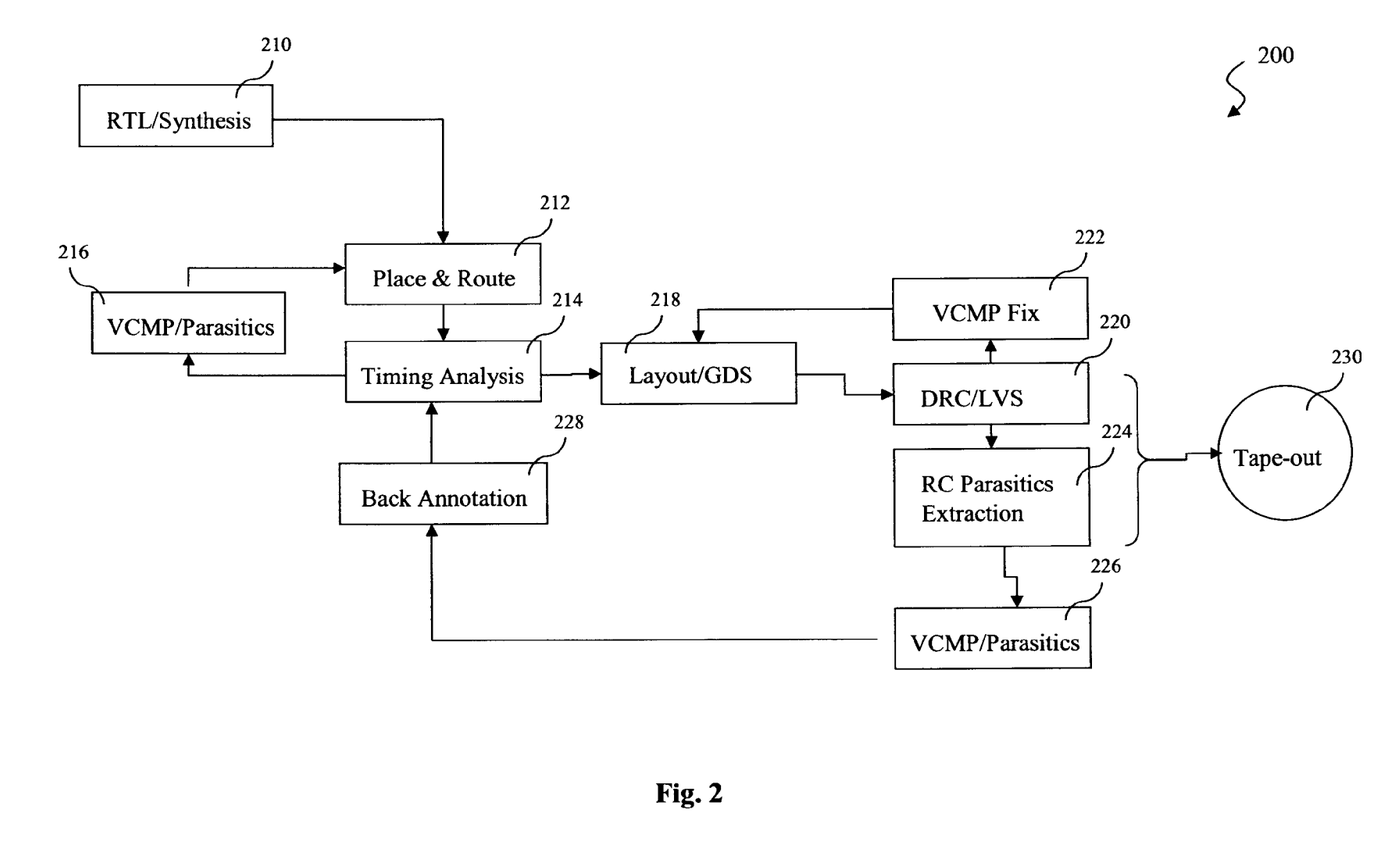
FIG. 2 is a flowchart of one embodiment of an integrated circuit (IC) design method constructed according to aspects of the present disclosure.

FIG. 2 is a flowchart of an IC design flow (or design method) 200 utilizing a virtual CMP (VCMP) and resistance and capacitance (RC) extraction integrated and incorporated into various steps thereof, with various functions and mechanism. A design system to implement the method 200 is described collectively. The VCMP and RC extraction are integrated to guide IC design and avoid CMP related layout issues.

The VCMP includes a CMP process simulator. The CMP simulator adopts a model to describe a CMP process and further includes the CMP manufacturing data to simulate a real manufacturing CMP process. The CMP manufacturing data may include CMP tool characterization data, CMP slurry and other chemicals characterization data, and CMP processing recipes. Design layout parameters are extracted from a layout such as a design layout presented in a GDS format and then provided for a CMP simulation to the layout. Further procedure may include RC extraction and timing simulation.

The IC design method 200 includes a front-end design flow before the physical layout design, such as a register-transfer level (RTL) design module 210. After the logic functionality is defined, the design flow proceeds to the back-end portion, which includes those design steps described below.

The design method 200 includes a place-and-route module 212. Standard cells, input/output (I/O) cells, and IP/Macro can be placed in various locations according to the functional connectivity and the optimization of signal routing. A physical layout is created at this stage.

The design method also includes a timing simulation module 214. After placement and routing are accomplished at step 212, a simplified RC extraction of the interconnection is performed for signal timing simulation. Routing and cell placement can be further optimized to improve signal timing.

An integrated virtual CMP (VCMP) and parasitic extraction module 216 is incorporated into the design flow from the timing analysis module 214 and the place and route module 212. A virtual CMP is integrated with RC parasitic extraction and enhance the back annotation to achieve precise estimation of wire thickness/resistance and derives better signal timing expectation. A quick evaluation of the CMP effect is therefore embedded in the timing closure flow to narrow down the gap between the first timing expectation and layout back-annotation. A loop including the timing simulation 214, VCMP/parasitic 216, and physical layout modification at the place and route 212 will continue until the signal timing is optimized to be within the expected specification. The VCMP 216 is invoked by the simplified RC extractor at step 214 to include the process influence of CMP to the resistance/thickness of the interconnection. Traditional RC extraction considers only ideal and constant thickness for the ideal RC extraction. VCMP embedded flow can introduce the silicon reality and eliminate the gap between the design expectation and silicon result. Alternatively, the loop may only include the place and route 212 and VCMP/Parasitic 216 to eliminate a simplified RC extraction of the interconnection. In another embodiment, the design method 200 may move from the place and route 212 to VCMP/parasitic 216 for simulated metal/dielectric thicknesses and parasitic RC parameters, and then moves to the timing analysis 214 for only timing evaluation based on the simulated CMP results.

The design method 200 also include layout/GDS module 218. After optimized placement and routing, the physical layout is created (in GDS format in one example) and finalized for further layout enhancement and sign-off verification. The design method 200 also includes design rule check (DRC) and layout vs. schematic (LVS) module 220. DRC is performed on the physical layout to verify that the manufacturer concerned process requirements have been satisfied. LVS is performed such that the devices/interconnects are extracted to generate a netlist for comparison with an original design netlist defined at step 210. This step is referred to as sign-off verification as well.

A VCMP fixing and enhancing module 222 is applied to the layout for reducing potential risk due to CMP process, eliminate CMP hotspots, and improve CMP processing yield. The VCMP fixing module 222 can be performed in parallel with the sign-off verification module 220 to reduce the potential CMP process risk and improve yield. Spacing and width can be adjusted to make the physical layout robust during the CMP process. The process result from the step 222 will be feedback to step 218 to tune the design layout. The VCMP fixing module 222 can be implemented by a VCMP fixer module integrated with the DFM utilities 130 of FIG. 1.

The design method 200 also includes a RC parasitic extraction module 224. Electrical parameter extraction of the physical layout is performed after the sign-off verification 220 has been accomplished. Parasitic resistance and capacitance of the interconnection and the devices are extracted based on VCMP to reflect real electric signal timing.

The design method 200 includes another integrated VCMP and parasitic extraction module 226, precisely predicting the CMP process effect in advance at the design stage, and to make the silicon results close to the design specification. Alternatively, the VCMP/Parasitic module 226 and 216 may share a common VCMP/Parasitic module for each intended purpose, partially share some functional sub-module, or mutual support each other. In another embodiment, a VCMP simulator is integrated with the RC parasitic extraction 224 to consider the influence of the CMP process induced interconnect thickness/resistance change.

More precise time simulations can be achieved in a back annotation module 228. With regards to the VCMP in step 226, the simulation results will have less gap or difference, as compared to the silicon behavior. The electrical parameters of the interconnect and device are back-annotated into the timing analysis of step 214 again to determine if further signal timing deviation appear according to the layout and the parasitic effect. The layout will be further tuned if the signal timing is out of specification.

The design method 200 proceeds to tape-out at step 230. After all the verifications of design functional specification, signal timing, device connectivity, and design rule of layout are accomplished, the layout will taped out and be provided to a manufacturer, such as a semiconductor foundry for fabrication.

Figure 3:
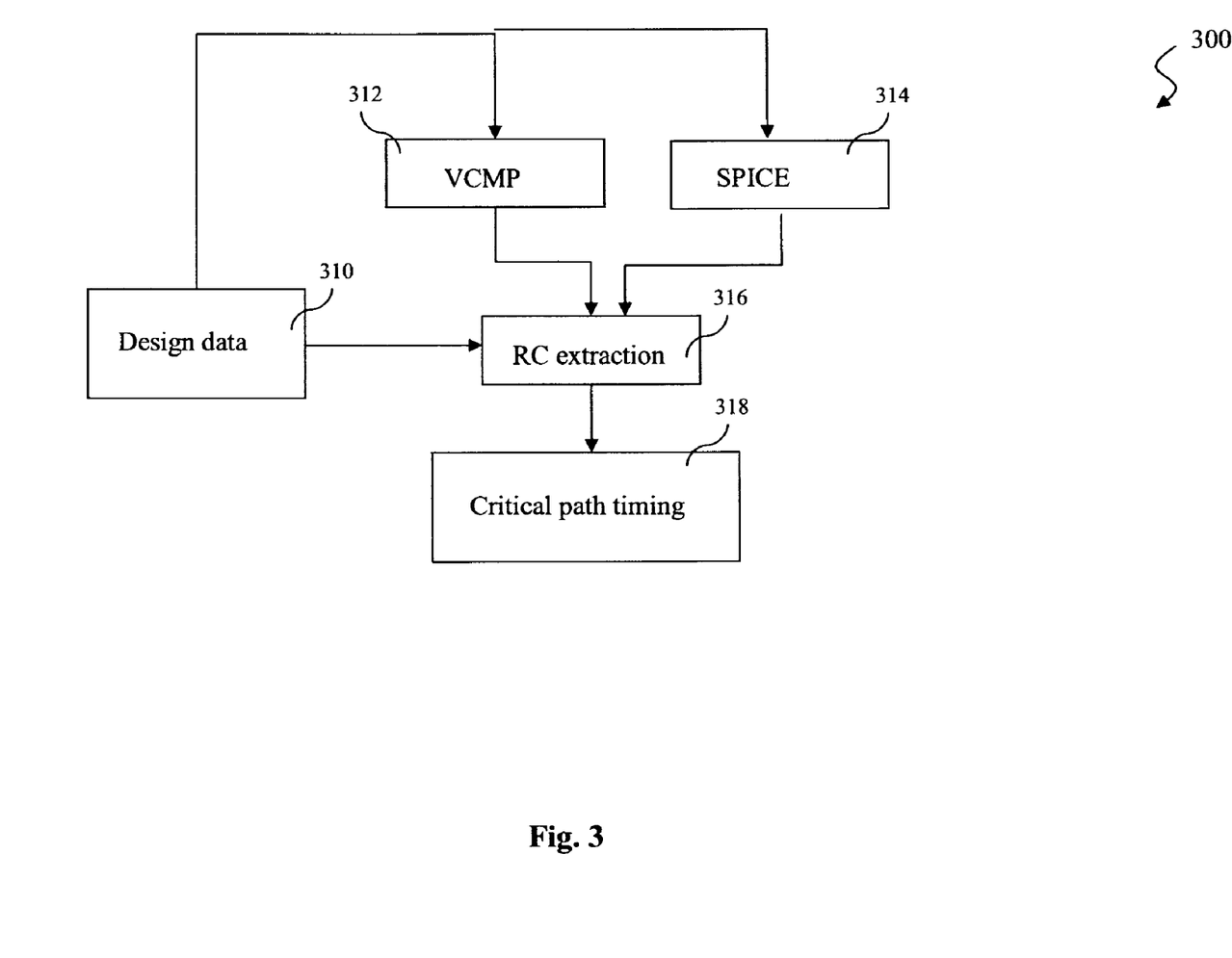
FIG. 3 is a flowchart of another embodiment of an integrated circuit (IC) design method constructed according to aspects of the present disclosure.

FIG. 3 is a block diagram 300 collectively illustrating an IC design method and an IC design system to implement the IC design method. The design method begins from design data 310. The design data 310 may be provided by front design steps such as RTL/synthesis, and place & route substantially similar to those described in FIG. 2. The design method then proceeds next step for virtual CMP (VCMP) simulation 312. The VCMP can simulate a manufacturing CMP process and its result over an IC substrate based on the IC design data. The VCMP can simulate and generate all relevant geometrical dimensions of the IC substrate after the CMP process. For example, the VCMP can generate a trench thickness. In another example, the VCMP may only be used to generate a trench thickness. In another embodiment, the VCMP can simulate CMP processes on stacked layers of the IC substrate to catch accumulated CMP process result from the stacked layers, and generate geometrical dimensions of the IC substrate therefrom. For example, a CMP process applied to metal one layer is simulated for metal one surface topography. Then, another CMP process applied to metal two layer is simulated with considering the surface topography of the metal one layer. In another embodiment, Additionally, the design method may implements an existing physical design tool in parallel at step 314. For example, The trench width may be generated from SPICE. The design data are also sent to this physical simulation tool such as a SPICE. SPICE is a tool to provide complete physical simulation including output signal deformation, signal level, and time delay. It can be used for analog design and especially for digital design with timing consideration. SPICE is a circuit-analysis programs developed by UC Berkeley. Another tool is ASTAP developed by IBM. Commercially available versions are typified as HSPIC. SPICE may be used to simulate and generate other geometrical dimensions, which are not sensitive to CMP processes. In one example, SPICE may generate a trench width. In another example, SPICE is used to generate all geometrical dimensions in parallel and is compared to VCMP for verification and/or quality assurance.

The design method proceeds next to step 316 for RC extraction. The data for RC extraction can be from VCMP, or both VCMP and SPICE, or additionally from the design data provided at step 310. In the RC extraction, capacitance is calculated based on dielectric layer thickness (or metal spacing) and metal width & thickness. Similarly, resistance is calculated based on metal thickness, width, and resistivity.

The design method then proceeds to a nest step 318 for critical path timing. The timing analysis is performed with extracted resistance and capacitance. The IC design method may return to step 310 to modify the design data from the critical path timing analysis at step 318, or from CMP simulation at step 312.

The disclosed design methods may have various embodiments, variations, and extensions. For example, the method may be performed in different order, certain loop, and different combinations of various design steps. When stacking effect is considered, all underlying layers are related to CMP simulation and RC extraction of an overlying layer. IC design method can be properly modified for optimized performance in dealing the stacking effect.

In various embodiments, the VCMP for the VCMP fixing process may include CMP advisories such as action required rules, recommended rules, and guidelines, which are provided to designers. For example, to a high local metal density area (metal density higher than 90% for instance), a guideline may include possible issues caused by the higher local metal density such as local resistance variation, and further RC delay impact. Other issues may include local topography variation and further induced upper layer metal bridging. The corresponding design guideline may include inserting dielectric (silicon oxide for example) slots in a wide metal line to reduce effective metal density, separating a wide metal line (more 4.5 micron for example) into several narrow metal lines (less than 2 micron for example) for equal resistance, and/or avoiding a narrow copper line in a upper metal layer cross a wide metal region. The CMP advisories are provided to designers for implementing thereof in their IC design. The CMP advisories can be implemented by the designers and/or design tools at a normal design flow and/or implemented after CMP simulations.

The CMP fixer can identify CMP processing hotspots based on the simulation results and the predefined CMP hotspots criteria or other design criteria such as timing specification. The identified hotspots are then further analyzed for design modification and optimization. Exemplary hotspots may include oxide erosion and copper dishing. Based on identified hotspots and the hotspots analysis, the CMP fixer can provide suggested design structures and other design suggestions guidelines to the designers and/or design tools for design improvement to eliminate the identified hotspots. The suggested design structures and other design suggestions may include the CMP advisories, or be combined with the CMP advisories, and provide suggested design structures and modifications specific to the CMP issues or the identified hotspots. For example, the suggested design structures for the high local metal density issues may include inserting dielectric slots in a wide metal line, separating a wide metal line into several narrow metal lines, and/or avoiding a narrow copper line in a upper metal layer cross a wide metal region. In one embodiment, the CMP fixer can provide dummy insertion for enhanced CMP performance.

Figure 4:
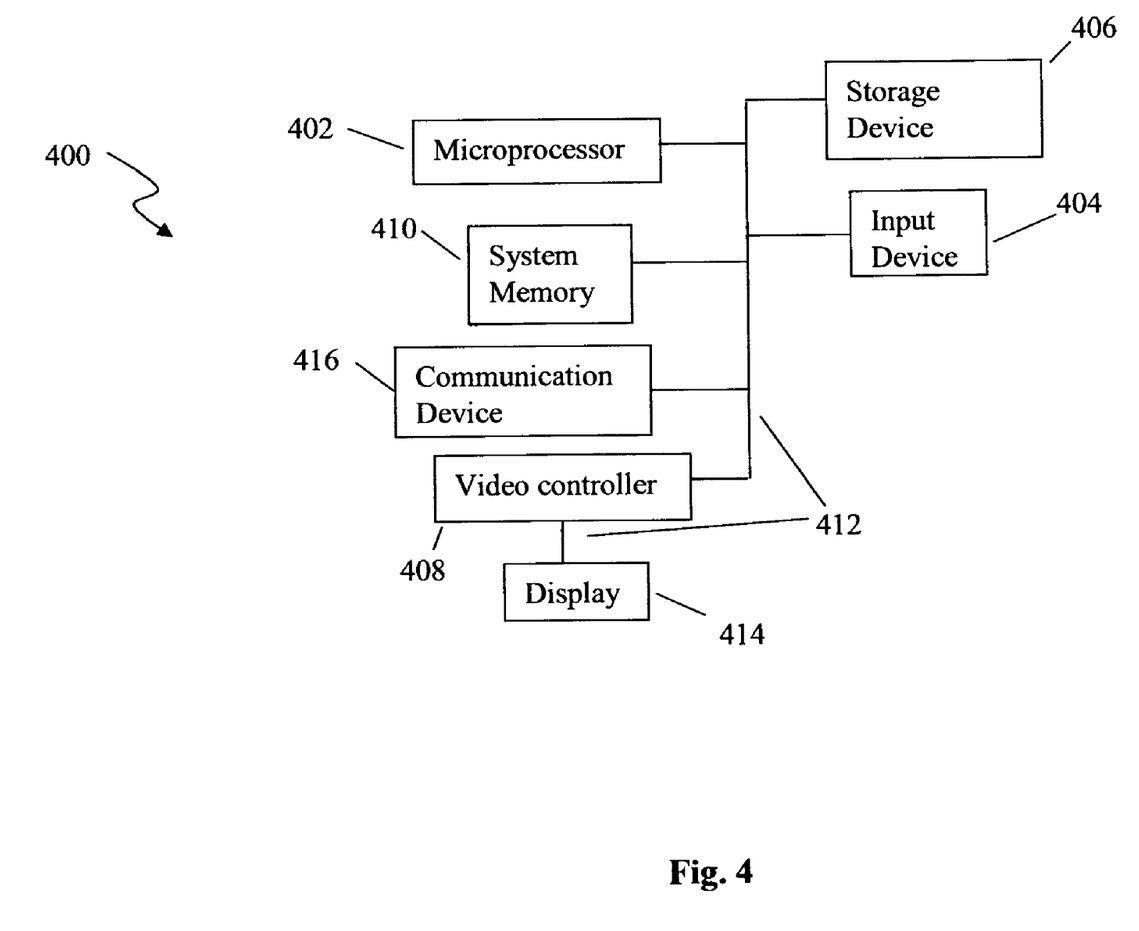
FIG. 4 is an illustration of a computer system for implementing one or more embodiments of the present invention.

Referring now to FIG. 4, shown therein is an illustrative computer system 400 for implementing embodiments of the methods described above. Computer system 400 includes a microprocessor 402, an input device 404, a storage device 406, a video controller 408, a system memory 410, and a display 414, and a communication device 416 all interconnected by one or more buses 412. The storage device 406 could be a floppy drive, hard drive, CD-ROM, optical drive, or any other form of storage device. In addition, the storage device 406 may be capable of receiving a floppy disk, CD-ROM, DVD-ROM, or any other form of computer-readable medium that may contain computer-executable instructions. Further communication device 416 could be a modem, network card, or any other device to enable the computer system to communicate with other nodes. It is understood that any computer system could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the present disclosure. One example is to directly manufacture software functions into a silicon chip. Accordingly, it should be understood that combinations of hardware and software are also included within the definition of a computer system and are thus envisioned by the present disclosure as possible equivalent structures and equivalent methods.

Computer-readable mediums include passive data storage, such as a random access memory (RAM) as well as semi-permanent data storage such as a compact disk read only memory (CD-ROM). In addition, an embodiment of the present disclosure may be embodied in the RAM of a computer to transform a standard computer into a new specific computing machine.

Data structures are defined organizations of data that may enable an embodiment of the present disclosure. For example, a data structure may provide an organization of data, or an organization of executable code. Data signals could be carried across transmission mediums and store and transport various data structures, and, thus, may be used to transport an embodiment of the present disclosure.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

Thus, the present disclosure provides an integrated circuit (IC) design method. The method includes providing IC design layout data; simulating a chemical mechanical polishing (CMP) process to a material layer based on the IC design layout, to generate various geometrical parameters; extracting resistance and capacitance based on the various geometrical parameters from the simulating of the CMP process; and performing circuit timing analysis based on the extracted resistance and capacitance.

In the disclosed IC design method, the simulating of the CMP process may include implementing a design-for-manufacturing (DFM) data kit having various CMP processing information. The various CMP processing information may include data selected from the group consisting of CMP processing recipes, CMP tool characterization, manufacturing environment, production and processing statistical information, and combinations thereof. The various geometrical parameters may include a dimension selected from the group consisting of metal thickness, dielectric thickness, and combinations thereof. The providing of the IC design layout data may include performing logical design; and performing a place and route process. The IC design method may further include modifying the IC design layout data based on the circuit timing analysis. The IC design method may further include performing design rule check (DRC) and logic vs. schematic (LVS) verification; fixing VCMP fixing hotspots; and providing layout/GDS data.

The present disclosure also provides another embodiment of an integrated circuit (IC) design method. The method includes performing IC logic design; performing place and route based on the IC logic design, to generate an IC design layout; performing timing analysis based on the IC design layout; performing a first chemical mechanical polishing (CMP) process simulation based on the IC design layout; performing a first resistance/capacitance (RC) extraction based on the first CMP process simulation; and identifying and fixing CMP hotspots on the IC design layout.

This IC design method may further include providing IC design layout; performing design rule check (DRC) and logic vs. schematic (LVS) verification; and provide IC design tapeout. This IC design method may further include performing a second CMP simulation and RC extraction; performing a back annotation to incorporating the second CMP simulation and RC extraction to the timing analysis. The IC design method further include providing an IC layout/GDS incorporated with the fixing of the CMP hotspots. The first CMP simulation and the first CMP simulation may be feedback to the performing of the place and route.

The present disclosure also provides an integrated circuit (IC) design system. The system includes a place-and-route module to generate an IC design layout; a chemical mechanical polishing (CMP) simulator designed to simulate a CMP process the IC design layout and generate various geometrical data; a resistance and capacitance (RC) extractor to extract RC based data from the various geometrical data; and a timing analyzer to perform timing analysis to the IC design layout.

In this IC design system, the CMP simulator may include a design-for-manufacturing (DFM) data kit. The DFM data kit may include data selected from the group consisting of CMP processing recipes, CMP tool characterization, manufacturing environment, production and processing statistical information, and combinations thereof. The CMP simulator may include a DFM advisor. The DFM advisor may further include one selected from the group consisting of action required rules, recommended rules, guidelines, and combinations thereof. The IC design system may further include a CMP fixer. The CMP fixer includes a dummy insertion module. The CMP fixer may include a CMP hotspot identifier. The IC design system may further include a design rule check (DRC) and logic vs. schematic (LVS) module; a back annotation module; and a layout/GDS module.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An integrated circuit (IC) design method comprising:
providing IC design layout;
providing chemical mechanical polishing (CMP) manufacturing data and the IC design layout to a CMP process model;
thereafter simulating a CMP process to a material layer using the CMP process model, to generate various geometrical parameters;
extracting resistance and capacitance based on the various geometrical parameters from the simulating of the CMP process;
performing circuit timing analysis based on the extracted resistance and capacitance, the circuit timing analysis being performed by using a computer;
adjusting spacing and widths of the IC design layout according to the circuit timing analysis;
performing a design rule check verification of the IC design layout against at least one design rule in parallel with the adjusting spacing and widths of the IC design layout according to the circuit timing analysis; and
making semiconductor circuits according to the IC design layout after the adjusting spacing and widths.

2. The IC design method of claim 1, wherein simulating the CMP process comprises implementing a design-for-manufacturing (DFM) data kit to provide the CMP manufacturing data.

3. The IC design method of claim 2, wherein the various CMP manufacturing data comprises data selected from the group consisting of CMP processing recipes, CMP tool characterization, CMP chemical characterization data, manufacturing environment, production and processing statistical information, and combinations thereof.

4. The IC design method of claim 1, wherein the various geometrical parameters comprise a dimension selected from the group consisting of metal thickness, dielectric thickness, and combinations thereof.

5. The IC design method of claim 1, wherein providing the IC design layout data comprises:
performing logical design; and
performing a place and route process.

6. The IC design method of claim 1, wherein the CMP manufacturing data are packed in a unified format.

7. The IC design method of claim 1, further comprising:
providing IC design layout/GDS data after the adjusting spacing and widths of the IC design layout.

8. An integrated circuit (IC) design method comprising:
performing IC logic design;
performing place and route based on the IC logic design, to generate an IC design layout;
providing chemical mechanical polishing (CMP) manufacturing data and the IC design layout to a CMP process model;
thereafter performing a first CMP process simulation using the CMP process model;
performing a first resistance/capacitance (RC) extraction based on the first CMP process simulation;
performing timing analysis based on the first RC extraction by using a computer;
identifying virtual chemical mechanical polishing (VCMP) hotspots on the IC design layout based on the timing analysis;
adjusting spacing and widths of the IC design layout based on the VCMP hotspots and the timing analysis independent of a design rule check verification of the IC design layout against at least one design rule;
making semiconductor circuits according to the IC design layout after the adjusting spacing and widths; and
performing the design rule check verification of the IC design layout against the at least one design rule in parallel with the adjusting spacing and widths of the IC design layout.

9. The IC design method of claim 8, further comprising:
performing logic vs. schematic (LVS) verification; and
providing IC design tape-out.

10. The IC design method of claim 8, further comprising:
performing a second CMP simulation and RC extraction;
performing a back annotation to incorporating the second CMP simulation and RC extraction to the timing analysis.

11. The IC design method of claim 8, further comprising providing an IC layout/GDS incorporated with the fixing of the CMP hotspots.

12. The IC design method of claim 8, wherein the CMP manufacturing data comprises CMP tool characterization data, CMP slurry and other chemicals characterization data, and CMP processing recipes.

13. An integrated circuit (IC) design system comprising:
a storage system;
at least one processor; and
one or more programs stored in the storage system and being executable by the at least one processor, the one or more programs comprising:
a place-and-route module to generate an IC design layout;
a chemical mechanical polishing (CMP) simulator having a CMP process model designed to simulate a CMP process to a substrate having a structure of the IC design layout and to generate various geometrical data of the IC design layout using manufacturing data;
a resistance and capacitance (RC) extractor to extract RC data from the various geometrical data;
a timing analyzer to perform timing analysis to the IC design layout using the RC data;
a CMP fixer for adjusting spacing and widths of the IC design layout based on the timing analysis and independent of at least one design rule for the IC design layout;
a design rule check module operable for checking the IC design layout in parallel with the CMP fixer against at least one design rule; and
a design-for-manufacturing (DFM) data kit designed to provide the manufacturing data to the CMP process model, wherein the manufacturing data are selected from the group consisting of CMP processing recipes, CMP tool characterization, manufacturing environment, CMP chemical characterization data, processing statistical information, and combinations thereof.

14. The IC design system of claim 13, wherein the CMP simulator further comprises a function to extract design layout parameters from the IC design layout.

15. The IC design system of claim 14, wherein the DFM data kit is packed in a DFM unified format (DUF).

16. The IC design system of claim 13, wherein the CMP simulator comprises a DFM advisor extracted from manufacturing information.

17. The IC design system of claim 16, wherein the DFM advisor further comprises one selected from the group consisting of action required rules, recommended rules, guidelines, and combinations thereof.

18. The IC design system of claim 13, wherein the CMP fixer comprises a dummy insertion module.

19. The IC design system of claim 13, wherein the CMP fixer comprises a CMP hotspot identifier for identifying hotspots of the IC design layout based on the timing analysis.

20. The IC design system of claim 13, further comprising:
a logic vs. schematic (LVS) module for checking the IC design layout;
a back annotation module for precise-time simulation according to the IC design layout; and
a layout/GDS module for generating GDS date of the IC design layout.

* * * * *